United States Patent
Kramer

(10) Patent No.: US 10,501,185 B2
(45) Date of Patent: Dec. 10, 2019

(54) UAV-MOUNTED DISPERSANT DEVICE WITH ELECTRONIC TRIGGERING MECHANISM

(71) Applicant: Aerial Enforcement Solutions LLC, Casper, WY (US)

(72) Inventor: Michael Todd Kramer, Casper, WY (US)

(\*) Notice: Subject to any disclaimer, the term of this patent is extended or adjusted under 35 U.S.C. 154(b) by 407 days.

(21) Appl. No.: 15/406,438

(22) Filed: Jan. 13, 2017

(65) Prior Publication Data

US 2018/0201371 A1 Jul. 19, 2018

(51) Int. Cl.
| | |
|---|---|
| *B64D 1/16* | (2006.01) |
| *A62C 3/02* | (2006.01) |
| *F41H 9/06* | (2006.01) |
| *F42B 12/46* | (2006.01) |
| *B05B 13/00* | (2006.01) |
| *B65D 83/26* | (2006.01) |

(52) U.S. Cl.
CPC ............. *B64D 1/16* (2013.01); *A62C 3/0235* (2013.01); *A62C 3/0242* (2013.01); *B05B 13/005* (2013.01); *B65D 83/262* (2013.01); *F41H 9/06* (2013.01); *F42B 12/46* (2013.01)

(58) Field of Classification Search
CPC ..... A62C 3/0228; A62C 3/0242; A62C 35/08; A62C 3/0235; B05B 13/005; B64D 1/16; B64D 1/18; F42B 12/46; F42B 12/48; F42C 19/06; F42C 19/12; F42C 19/083; F41H 9/06; B65D 83/262
USPC ................. 239/171; 169/53; 102/334, 202.5, 102/202.11, 202.14
See application file for complete search history.

(56) References Cited

U.S. PATENT DOCUMENTS

| | | | | |
|---|---|---|---|---|
| 2,480,967 | A * | 9/1949 | Ritchie | B64D 1/18 220/89.2 |
| 4,291,629 | A * | 9/1981 | Kezer | F42B 12/48 102/334 |
| 7,510,142 | B2 | 3/2009 | Johnson | |
| 8,967,029 | B1 * | 3/2015 | Calvert | F41H 13/00 239/171 |
| 2007/0200027 | A1 | 8/2007 | Johnson | |
| 2009/0321094 | A1 * | 12/2009 | Thomas | A62C 3/025 169/70 |
| 2013/0134254 | A1 * | 5/2013 | Moore | B64D 1/16 244/17.11 |
| 2013/0206915 | A1 | 8/2013 | Desaulniers | |
| 2014/0018976 | A1 | 1/2014 | Goossen et al. | |
| 2014/0336848 | A1 * | 11/2014 | Saund | G08G 1/054 701/3 |
| 2016/0082460 | A1 | 3/2016 | McMaster et al. | |
| 2016/0260207 | A1 * | 9/2016 | Fryshman | G06T 7/0008 |
| 2016/0304217 | A1 | 10/2016 | Fisher et al. | |

(Continued)

*Primary Examiner* — Cody J Lieuwen
(74) *Attorney, Agent, or Firm* — Antoinette M. Tease

(57) ABSTRACT

An accessory for an unmanned aerial vehicle (UAV) comprising a baseplate that is attached to the UAV unmanned aerial vehicle, at least one dispersant canister that is removably attached to the baseplate, a radio frequency receiver, an auxiliary circuit board, at least one battery, first and second wire pairs that supply electrical current from the auxiliary circuit board, a protective housing, and a radio frequency transmitter that is in communication with the radio frequency receiver. In alternate embodiments, the invention further comprises an electric match, linear solenoid, or electric primer.

13 Claims, 12 Drawing Sheets

(56) References Cited

U.S. PATENT DOCUMENTS

2016/0307448 A1    10/2016  Salnikov et al.
2016/0355258 A1*   12/2016  Williams .............. B64C 39/024
2017/0144756 A1*   5/2017   Rastgaar Aagaah ........................
                                                          B64C 39/024
2018/0093284 A1*   4/2018   Harris .................... B64C 1/061

* cited by examiner

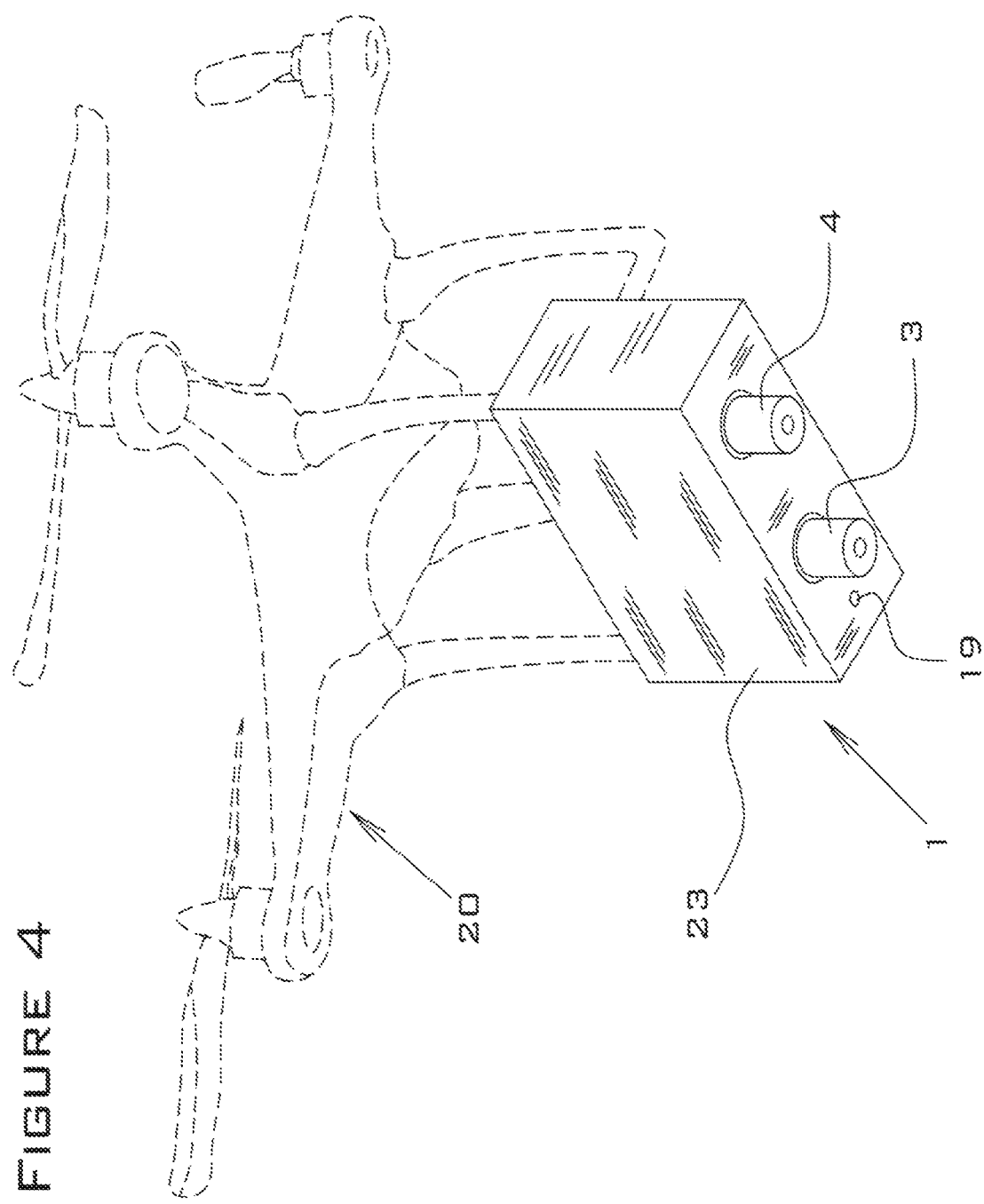

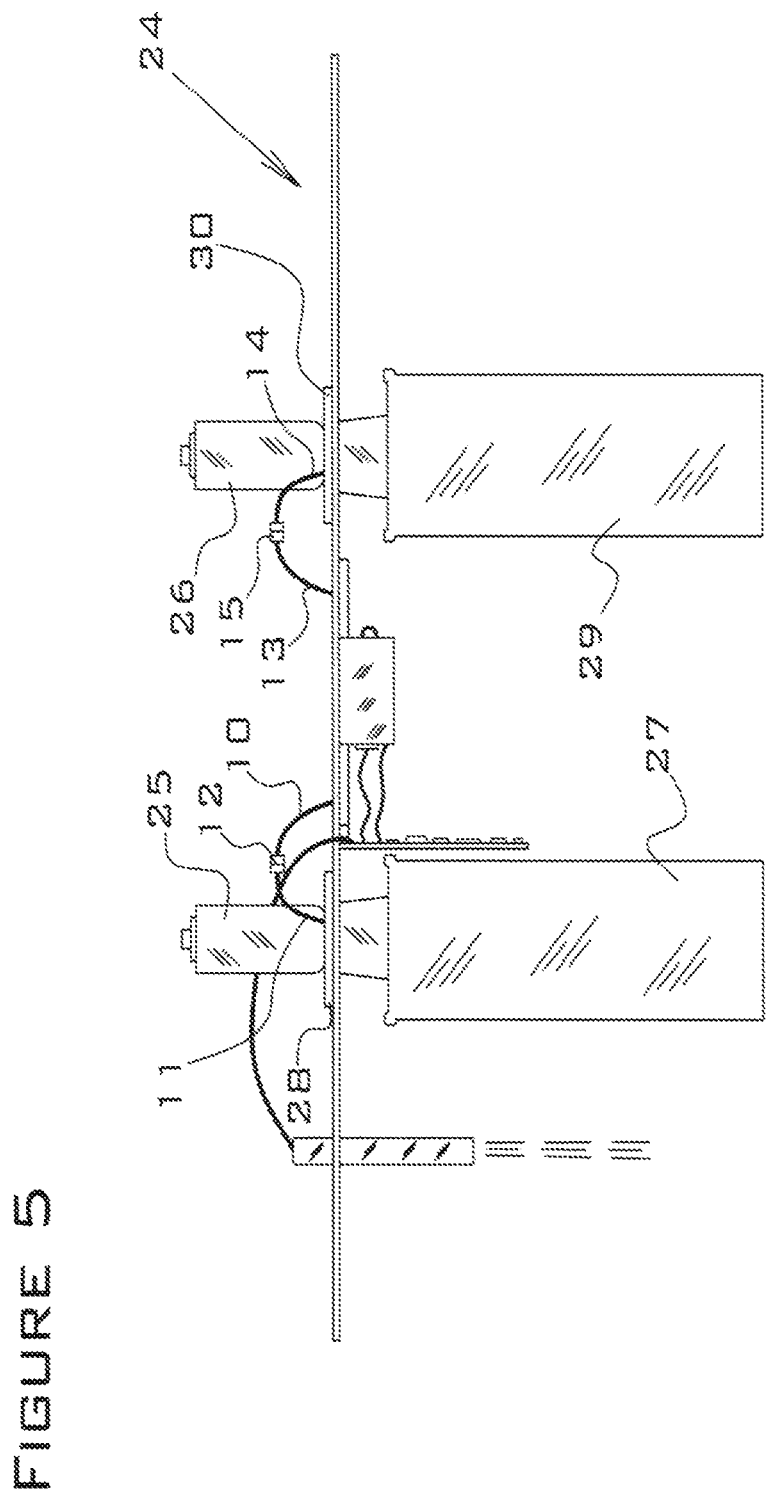

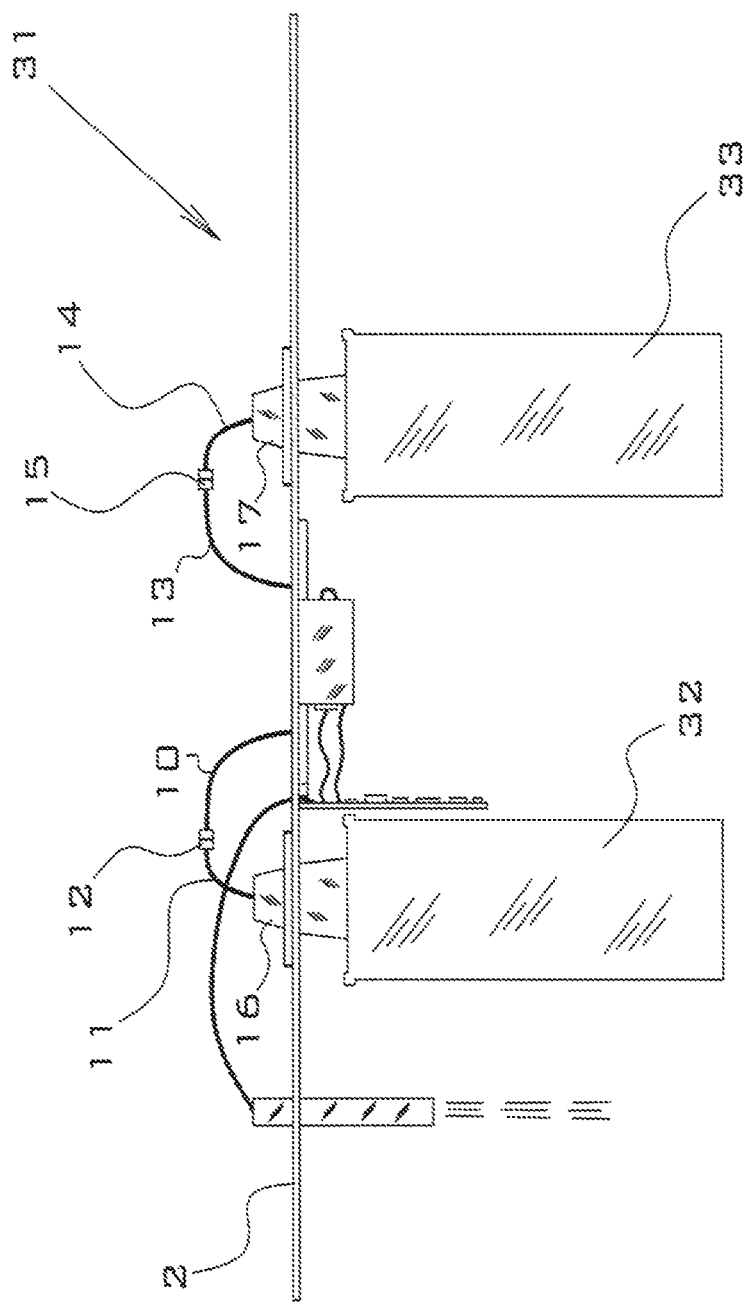

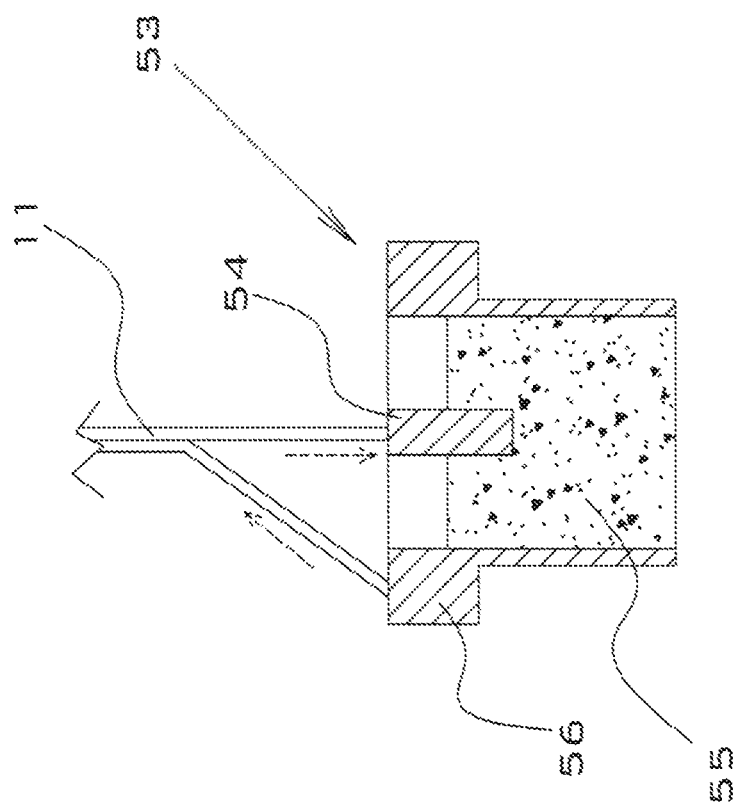
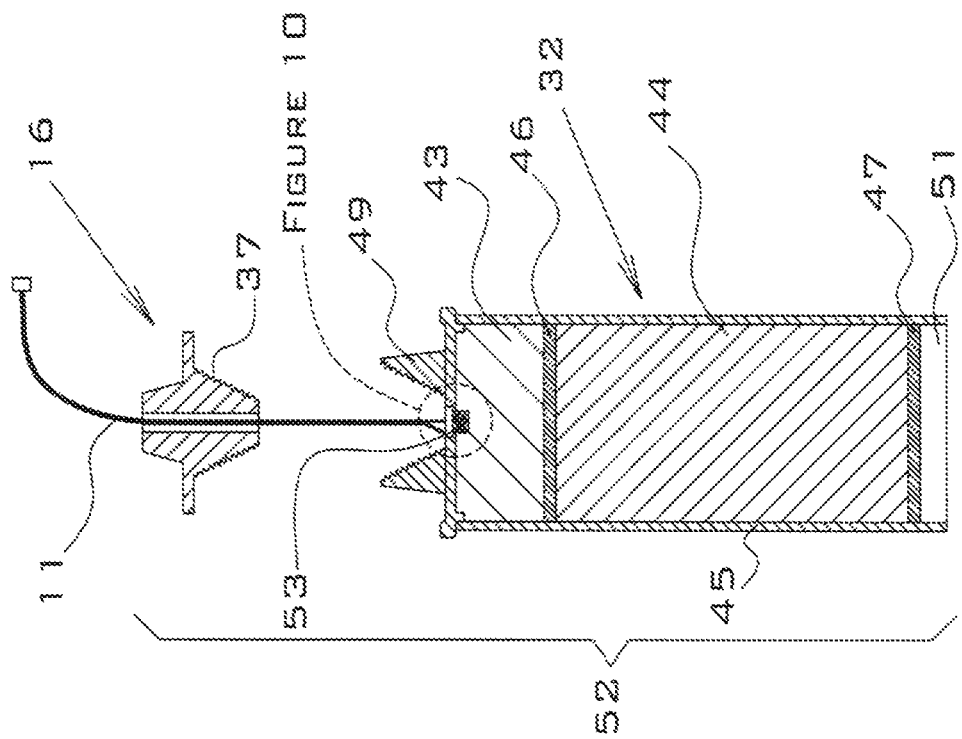

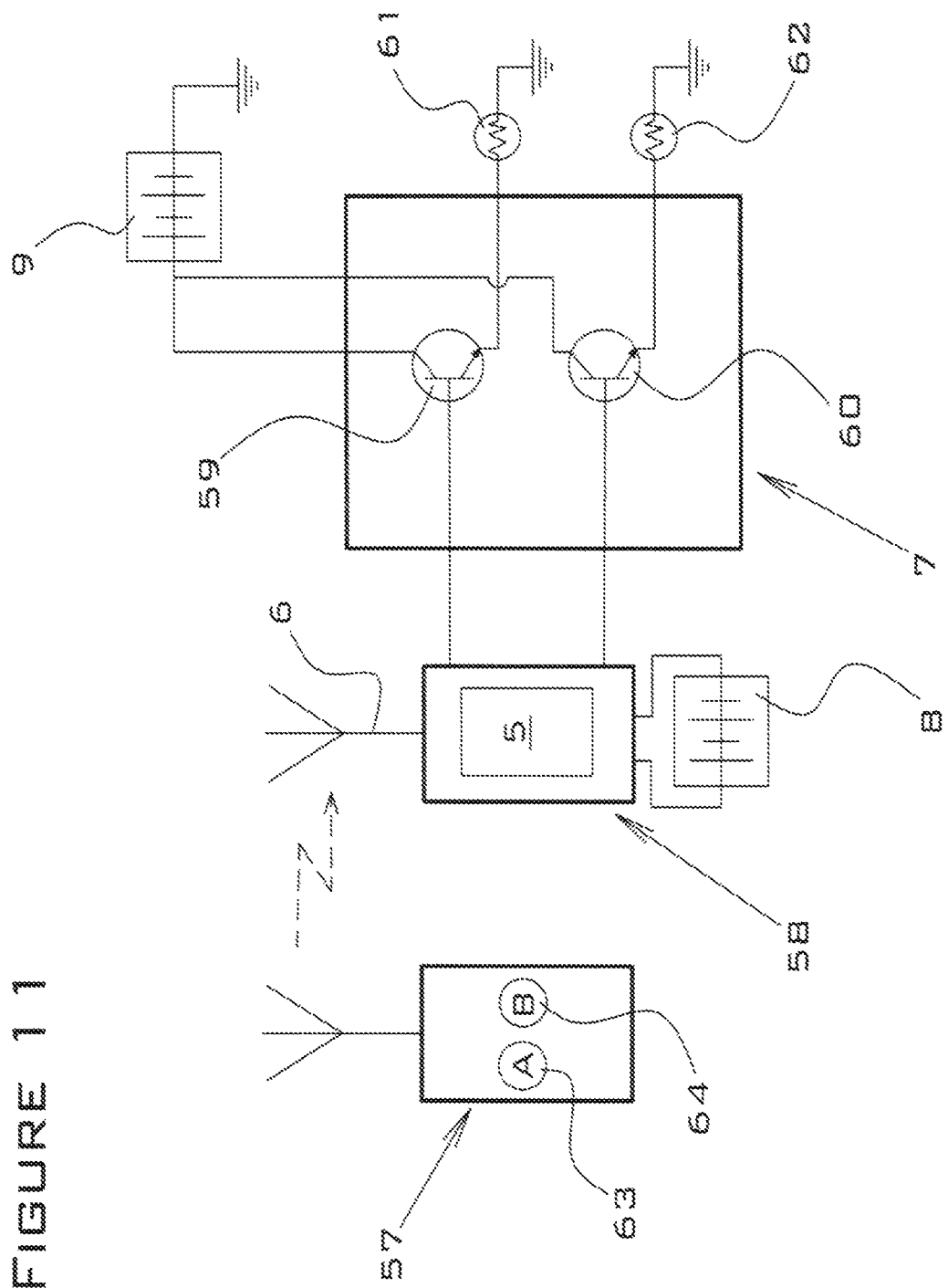

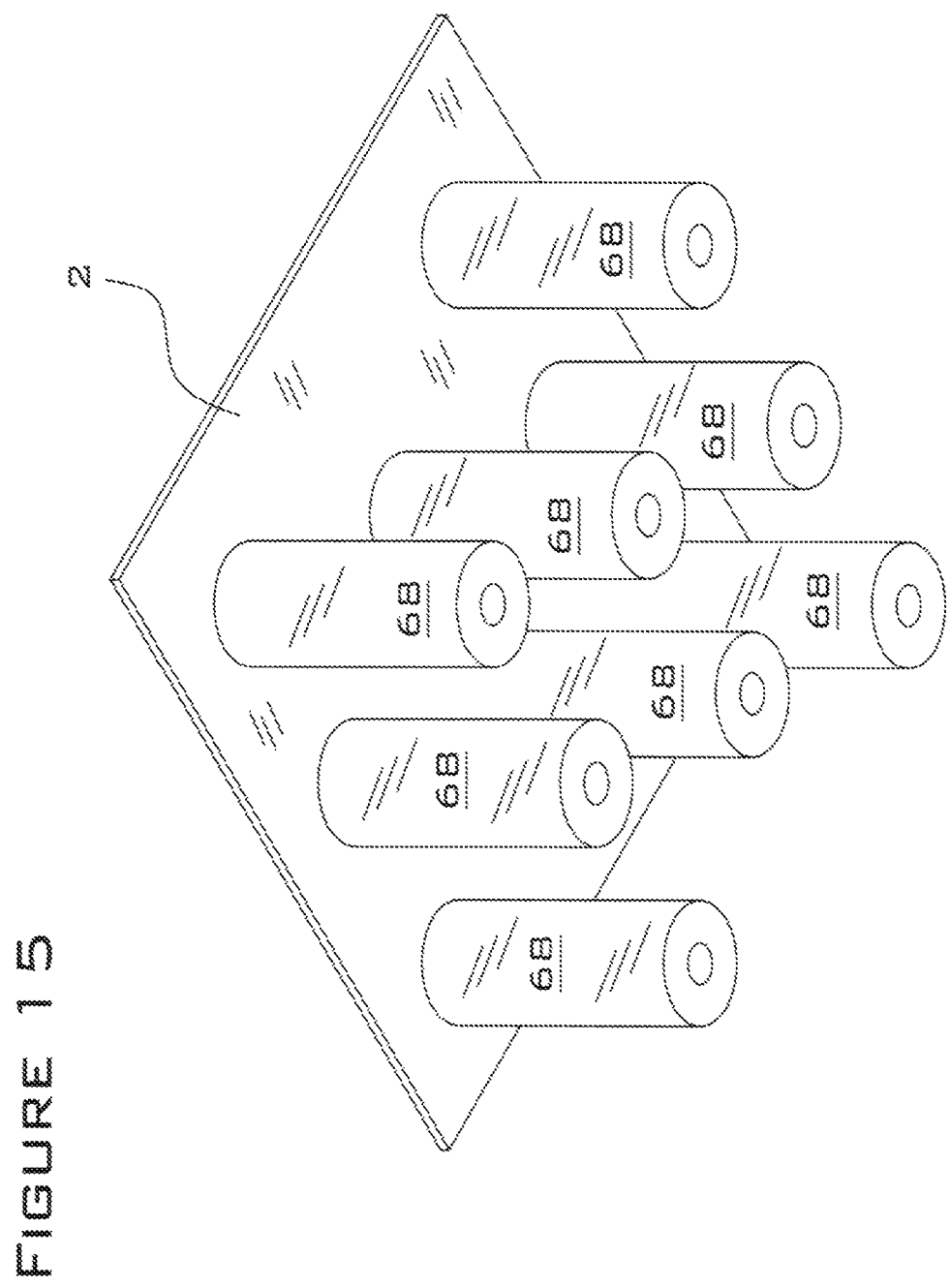

UAV-MOUNTED DISPERSANT DEVICE WITH ELECTRONIC TRIGGERING MECHANISM

BACKGROUND OF THE INVENTION

The present invention relates to the field of devices that deliver and disperse airborne chemical agents, and more particularly, to remotely controlled dispersal devices that comprise electrical ignition systems to initiate the dispersal of chemicals.

1. Description of the Related Art

There are numerous examples of unmanned aerial vehicles (UAVs) that are designed for specific purposes and the subject of issued patents and published patent applications, but none of these inventions incorporates the structural features and functional capabilities of the present invention. The present invention is a dispersant delivery device that is removably mountable on a variety of types and sizes of UAVs. The present invention utilizes remotely-controlled electrical currents to initiate the release of chemical agents such as colored smoke, chemical irritants and fire retardants. These dispersants may be used for a wide variety of applications including riot control, protective screening of troops, and wildfire suppression. The electronic circuitry of the present invention is compatible with a variety of dispersant devices that are triggered by electric match, percussion primer, electrical primer or pressure valve activation.

U.S. Pat. No. 7,510,142 (Johnson, 2009) discloses an aerial robot comprising dual counter-rotating propellers, a camera, and a transmission line. The transmission line provides electrical power to the aerial robot from a ground-based station, as well as two-way data communication between the aerial robot and the ground station.

U.S. Pat. No. 8,967,029 (Calvert, 2015) discloses an unmanned aerial device that comprises live, toxin-carrying mosquitoes. The mosquitoes may be aerially released by remote control via a valved release tube that is connected to the mosquito container. Details of the valve mechanism are not disclosed. There is no disclosure of igniters or solenoids to operate the valve mechanism.

U.S. Patent Application Pub. No. 2013/0206915 (Desaulniers) discloses a craft that is able to navigate in air, on land, underwater, and in outer space. The craft may be controlled by either an on-board pilot or remotely. The invention comprises both propeller engines and rocket engines and is positionally stabilized via a gyroscope and pendulum mechanism.

U.S. Patent Application Pub. No. 2014/0018976 (Goossen et. al.) discloses a system and method for collecting data from an unmanned aerial vehicle. The invention comprises an unmanned aerial vehicle that is capable of collecting, storing and transmitting data, and a remote control station that is capable of selectively retrieving and transmitting data to and from the unmanned aerial vehicle. The retrieved data may include flight report information that is required by regulatory agencies.

U.S. Patent Application Pub. No. 2016/0082460 (McMaster et al.) discloses systems and methods for unmanned aerial painting applications. The invention includes several embodiments of an unmanned aerial vehicle system that apply paint to the surfaces of structures that are difficult or hazardous to be painted manually, such as tall buildings and bridges. In one embodiment, the paint supply is located in a ground-based storage tank and is pumped via hose to the UAV. In another embodiment, the paint supply is a portable canister that is mounted directly to the UAV.

U.S. Patent Application Pub. No. 2016/0304217 (Fisher et al.) discloses personal unmanned aerial vehicles with docking ports that are attached to items of wearable gear such as helmets, hardhats and shoes and that may be attached to vehicles, buildings, towers, and other structures. The docking stations may provide wireless recharging of UAVs in addition to conventional docked charging and data communication.

U.S. Patent Application Pub. No. 2016/0307448 (Salnikov et al.) discloses an unmanned hybrid airship-drone that is optimized for farming applications such as crop dusting, planting and fertilizing. The invention is capable of refilling via hose (for liquids) or truck (for solids) from ground-based reservoirs. The invention comprises a gas-filled balloon section for added lift.

None of the examples of prior art cited above incorporates an electrical ignition mechanism that is capable of igniting a flammable device such as smoke canister, firing a percussion-primed dispersant canister, firing an electrically primed dispersant canister, or actuating a pressurized canister via a linear solenoid. In addition, none of the examples of prior art cited above incorporates an incendiary element, such as an electric match, that provides for the release of dispersant from a pressurized canister by melting or burning away the shutoff valve of the canister.

A first object of the present invention is to provide a UAV-mountable system that utilizes remotely controlled electrical current to ignite or otherwise activate chemical dispersant devices. A second object of the present invention is to provide an electrical firing circuit that is capable of igniting or otherwise activating a plurality of dispersant devices at different times during a single UAV flight. A third object of the present invention is to provide an electrical firing circuit that may be optionally fitted with a variety of ignition elements such as electric matches, linear solenoids, or electric primers, with no modifications required for the electronic components of the circuit boards when switching between the various ignition elements. A fourth object of the present invention is to provide an optional optical aiming system to optimize the accuracy of the deployment of the dispersed chemical agents.

BRIEF SUMMARY OF THE INVENTION

In a first embodiment, the present invention is an accessory for an unmanned aerial vehicle, the accessory comprising: a baseplate that is configured to be attached to the unmanned aerial vehicle; at least one dispersant canister that is removably attached to the baseplate; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate an electric match that is installed within the dispersant canister; at least one battery that is attached to the baseplate and configured to provide an output power source for the radio frequency receiver circuit board and the electric match; a first wire pair that is connected to a second wire pair via an electrical connector, wherein the first and second wire pairs supply electrical ignition current from the auxiliary circuit board to the electric match; a protective housing that surrounds radio frequency receiver circuit board and the battery; and a radio frequency transmitter that is in communication with the radio frequency receiver, the radio frequency transmitter comprising a radio frequency transmitter circuit board and at least one switch.

In a second embodiment, the present invention is an accessory for an unmanned aerial vehicle, the accessory comprising: a baseplate that is configured to be attached to the unmanned aerial vehicle; at least one percussion-primed chemical dispersant canister that is attached to the baseplate; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate a linear solenoid, the linear solenoid being mounted to a solenoid connector, and the solenoid connector being removably attached to the percussion-primed chemical dispersant canister; at least one battery that is attached to the baseplate and configured to provide an output power source for the radio frequency receiver circuit board and the linear solenoid; a first wire pair that is connected to a second wire pair via an electrical connector, wherein the first and second wire pairs supply electrical current from the auxiliary circuit board to the linear solenoid; a protective housing that surrounds the radio frequency receiver circuit board and the battery; and a radio frequency transmitter that is in communication with the radio frequency receiver, the radio frequency transmitter comprising a radio frequency transmitter circuit board and at least one switch. Preferably, the percussion-primed chemical dispersant canister comprises a percussion primer, a propellant charge, a chemical dispersant agent, a casing, a first wad that is configured to separate the propellant charge from the chemical dispersant agent, and a second wad that is configured to secure the chemical dispersant within the casing; the percussion-primed chemical dispersant canister has a longitudinal axis; and the linear solenoid has an actuator rod and a longitudinal axis that is aligned with the longitudinal axis of the percussion-primed chemical dispersant canister so that the actuator rod is positioned directly above the percussion primer.

In a third embodiment, the present invention is an accessory for an unmanned aerial vehicle, the accessory comprising: a baseplate that is configured to be attached to the unmanned aerial vehicle; at least one pressurized chemical dispersant canister that is attached to the baseplate, the pressurized chemical dispersant canister having a release valve actuator; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate a linear solenoid, the linear solenoid being mounted to a solenoid connector, and the solenoid connector being removably attached to the pressurized chemical dispersant canister; at least one battery that is attached to the baseplate and configured to provide an output power source for the radio frequency receiver circuit board and the linear solenoid; a first wire pair that is connected to a second wire pair via an electrical connector, wherein the first and second wire pairs supply electrical current from the auxiliary circuit board to the linear solenoid; a protective housing that surrounds radio frequency receiver circuit board and the battery; and a radio frequency transmitter that is in communication with the radio frequency receiver, the radio frequency transmitter comprising a radio frequency transmitter circuit board and at least one switch. Preferably, the pressurized chemical dispersant canister contains a chemical dispersant agent; and the linear solenoid is configured to move the release valve actuator when electrical current is passed through the solenoid.

In a fourth embodiment, the present invention is an accessory for an unmanned aerial vehicle, the accessory comprising: a baseplate that is configured to be attached to the unmanned aerial vehicle; at least one electrically primed chemical dispersant canister that is removably attached to the baseplate; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate an electric primer; at least one battery that is attached to the baseplate and configured to provide an output power source for the radio frequency receiver circuit board and the electric primer; a first wire pair that is connected to a second wire pair via an electrical connector, wherein the first and second wire pairs supply electrical ignition current from the auxiliary circuit board to the electric primer; a protective housing that surrounds radio frequency receiver circuit board and the battery; and a radio frequency transmitter that is in communication with the radio frequency receiver, the radio frequency transmitter comprising a radio frequency transmitter circuit board and at least one switch. Preferably, the electric primer comprises an inner electrode, a powder charge, and an outer electrode; and the second wire pair is configured to transmit an electrical current into the inner electrode, through the powder charge, and out of the outer electrode, thereby causing the powder charge and the propellant charge to ignite and the chemical dispersant agent to be expelled from the canister.

In a fifth embodiment, the present invention is an accessory for an unmanned aerial vehicle, the accessory comprising: a baseplate that is configured to be attached to the unmanned aerial vehicle; at least one pressurized chemical dispersant canister that is removably attached to the baseplate, the canister having a shutoff valve; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate an electric match that is installed within the dispersant canister; at least one battery that is attached to the baseplate and configured to provide an output power source for the radio frequency receiver circuit board and the electric match; a first wire pair that is connected to a second wire pair via an electrical connector, wherein the first and second wire pairs supply electrical ignition current from the auxiliary circuit board to the electric match, the electric match being configured to melt the shutoff valve upon ignition of the electric match; a protective housing that surrounds radio frequency receiver circuit board and the battery; and a radio frequency transmitter that is in communication with the radio frequency receiver, the radio frequency transmitter comprising a radio frequency transmitter circuit board and at least one switch.

In a sixth embodiment, the present invention is an accessory for an unmanned aerial vehicle, the accessory comprising: a baseplate that is configured to be attached to the unmanned aerial vehicle; at least one percussion-primed canister containing a projectile, the canister being attached to the baseplate; a radio frequency receiver comprising a radio frequency circuit board that is attached to the baseplate and a radio frequency receiver antenna with a proximal end that is mounted to the radio frequency receiver circuit board and a distal end that is unattached; an auxiliary circuit board that is attached to the baseplate and configured to supply electrical current sufficient to activate a linear solenoid, the linear solenoid being mounted to a solenoid connector, the solenoid connector being removably attached to the canister; at least one battery that is attached to the baseplate and configured to provide an output power source for the radio frequency receiver circuit board and the linear solenoid; a first wire pair that is connected to a second wire pair via an electrical connector, wherein the first and second wire pairs supply electrical current from the auxiliary circuit board to the linear solenoid; a protective housing that surrounds radio frequency receiver circuit board and the battery; and a radio frequency transmitter that is in communication with the radio frequency receiver, the radio frequency transmitter comprising a radio frequency transmitter circuit board and at least one switch. Preferably, the percussion-primed canister comprises a percussion primer, a propellant charge, a casing, and a wad that is configured to separate the propellant charge from the projectile; the canister has a longitudinal axis; and the linear solenoid has an actuator rod and a longitudinal axis that is aligned with the longitudinal axis of the percussion-primed canister so that the actuator rod is positioned directly above the percussion primer.

Optionally, the invention further comprises a gimbal that is mounted to an underside of the unmanned aerial vehicle, and the baseplate is mounted to an underside of the gimbal. In an alternate embodiment, the invention further comprises a camera that is mounted to the gimbal. In another alternate embodiment, the invention further comprises a camera that is mounted to the baseplate. In another alternate embodiment, the invention further comprises a laser pointer that is attached to the baseplate and configured to emit laser light in a generally downward direction parallel to the longitudinal axis of the dispersant canister. In another alternate embodiment, the baseplate further comprises a universal rail mount system for attachment of additional accessories.

BRIEF DESCRIPTION OF THE DRAWINGS

FIG. 4 is a perspective view of the first embodiment including a protective housing.

FIG. 5 is a front elevation view of a second embodiment of the present invention.

FIG. 6 is a front elevation view of a third embodiment of the present invention.

FIG. 9 is an exploded longitudinal cross-section view of the first electrically primed chemical dispersant canister assembly of the third embodiment.

FIG. 10 is a magnified view of the electric primer of the third embodiment.

FIG. 11 is a simplified electrical schematic that is applicable to all of the three embodiments of the present invention.

FIG. 15 is an isometric view of the underside of a baseplate that is fitted with eight canisters.

REFERENCE NUMBERS

Figure 1:
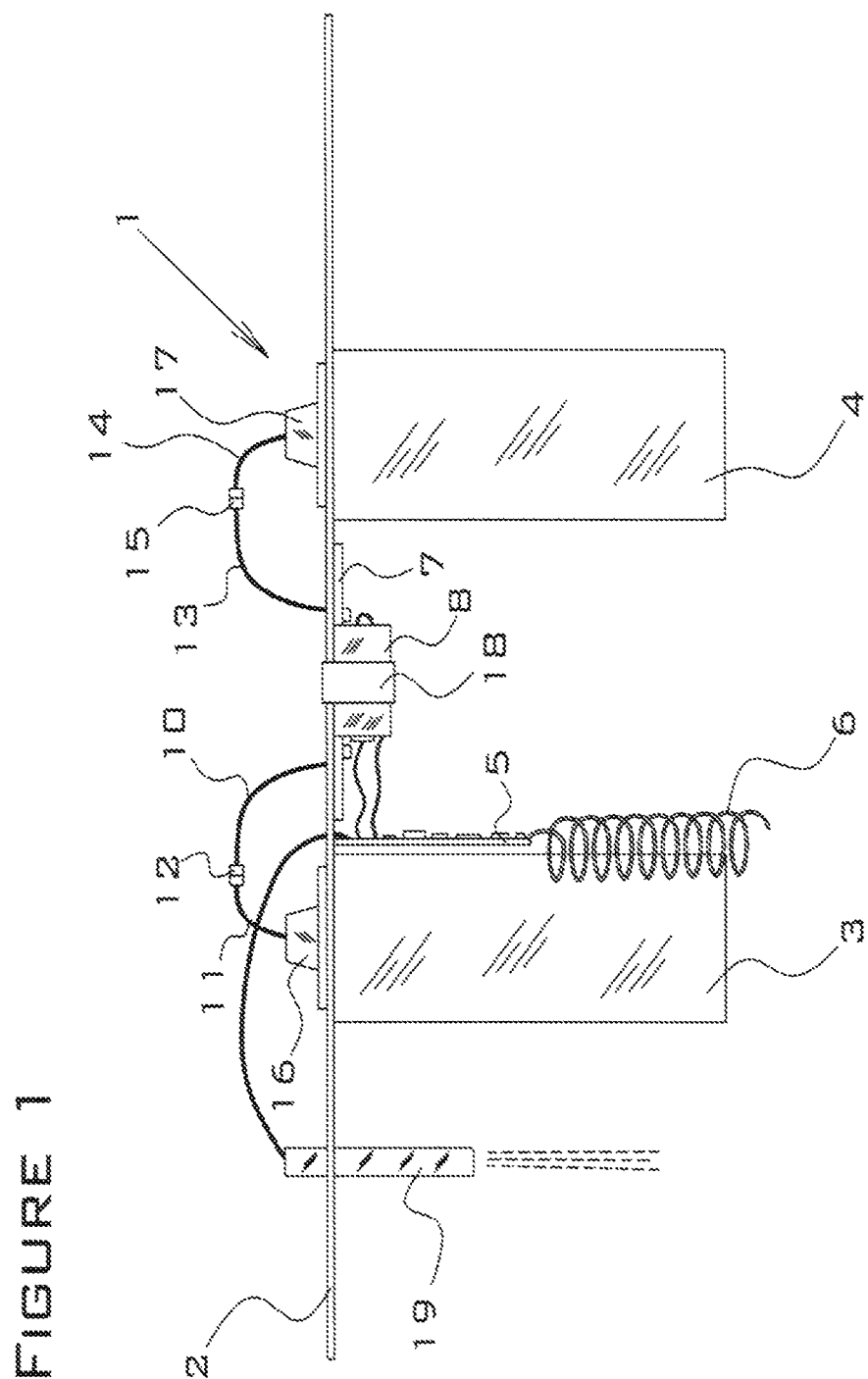
FIG. 1 is a front elevation view of a first embodiment of the present invention.

1 First embodiment of the present invention
2 Baseplate
3 First smoke canister
4 Second smoke canister
5 Radio frequency (RF) receiver circuit board
6 RF receiver antenna
7 Auxiliary circuit board
8 First battery
9 Second battery
10 First wire pair
11 Second wire pair
12 First electrical connector
13 Third wire pair
14 Fourth wire pair
15 Second electrical connector
16 First threaded top
17 Second threaded top
18 Battery containment strap
19 Laser pointer
20 Unmanned aerial vehicle (UAV)
21 Landing leg of UAV
22 Bolt
23 Protective housing
24 Second embodiment of the present invention
25 First linear solenoid
26 Second linear solenoid
27 First percussion-primed chemical dispersant canister
28 First solenoid connector
29 Second percussion-primed chemical dispersant canister
30 Second solenoid connector
31 Third embodiment of the present invention
32 First electrically primed chemical dispersant canister
33 Second electrically primed chemical dispersant canister
34 First smoke canister assembly
35 Electric match
36 Bore of the first threaded top
37 Male threaded portion of the first threaded connector
38 Female threaded portion of the first smoke canister
39 Bore of the first smoke canister
40 Smoke-producing compound of the first smoke canister
41 First percussion-primed chemical dispersant canister assembly
42 Percussion primer
43 Propellant charge
44 Chemical dispersant agent
45 Casing
46 First wad
47 Second wad 48 Male threaded portion of the first solenoid connector
49 Female threaded portion of the percussion and electrically primed canisters
50 Actuator rod of the first linear solenoid
51 Open bottom of the casing
52 First electrically primed chemical dispersant canister assembly
53 Electric primer
54 Inner electrode of the electric primer
55 Powder charge of the electric primer
56 Outer electrode of the electric primer
57 RF transmitter
58 RF receiver
59 First transistor
60 Second transistor
61 First ignition device
62 Second ignition device
63 Pepper spray canister
64 Outlet nozzle of pepper spray canister
65 Release valve lever (actuator) of pepper spray canister
66 Gimbal
67 Video camera
68 Canister

DETAILED DESCRIPTION OF INVENTION

The present invention is a dispersant delivery device that is capable of being mounted on a UAV. The present invention is capable of producing controlled releases of a wide variety of dispersants including smoke, chemical irritant gasses, pepper spray, colored powder, fire retardants and other canister-packed chemical agents. Various types of smoke dispersants may include psychoactive agents that produce a sedative effect when inhaled or colored smoke for the purposes of signaling, smoke screen cover, and concealment. The smoke may be specially formulated to block infrared light, thereby providing cover from thermal imaging devices. The present invention may also be configured so as to launch canisters or projectiles containing non-lethal chemical irritant liquids or powders. The present invention comprises three preferred embodiments, all of which employ a wireless radio-frequency (RF) triggering signal from a remote operator. The three preferred embodiments also all utilize electrical currents to initiate the release of the dispersants. The first preferred embodiment comprises electric matches as incendiary igniters, the second preferred embodiment comprises linear solenoids that ignite percussion primers or actuate gas valves, and the third preferred embodiment comprises electric primers that ignite propellant charges. Although each of the three embodiments is described in detail in this section as having two attached dispersant canisters, it should be understood that each of the embodiments may be manufactured so as to comprise a fewer or greater number of dispersant canisters.

Figure 2:
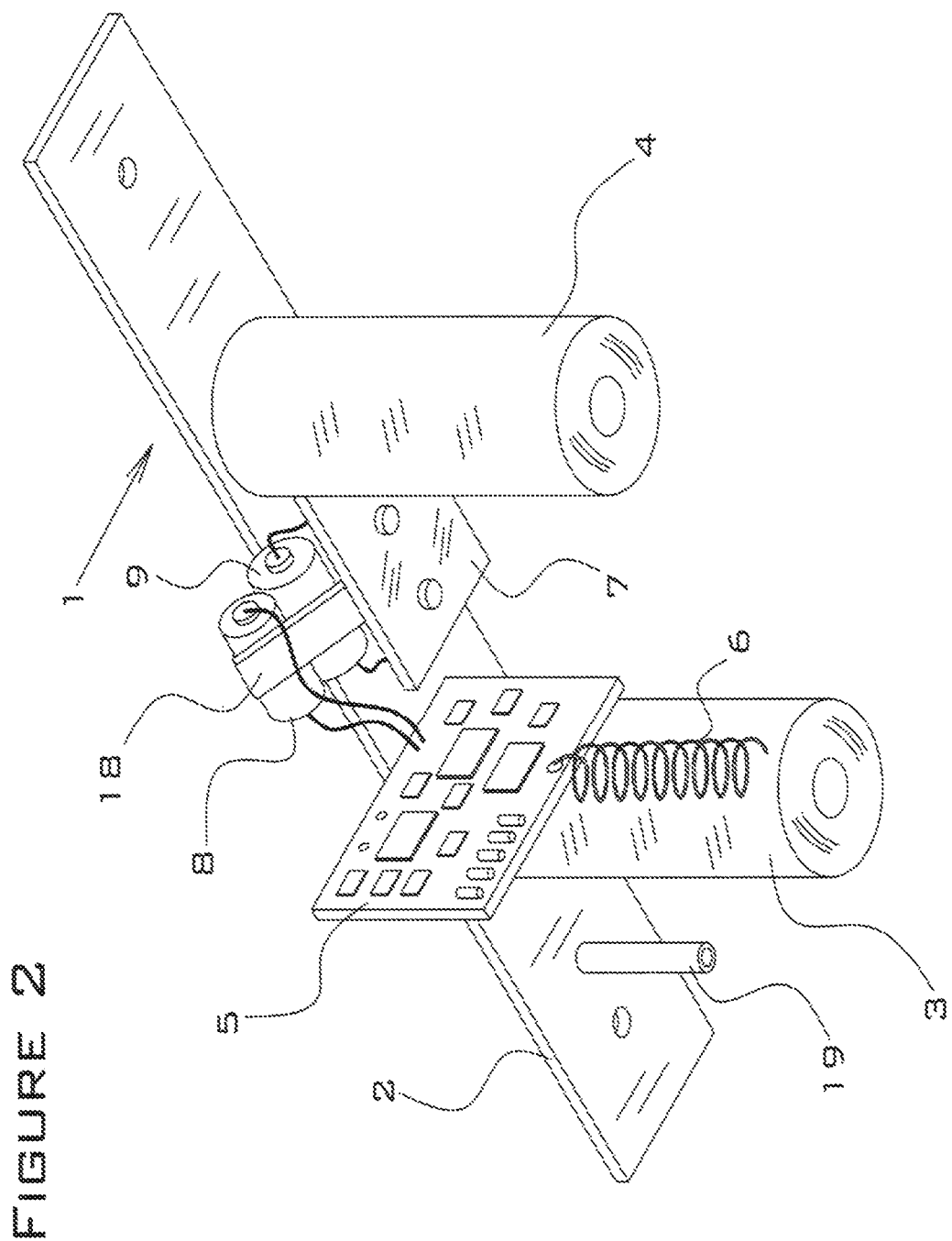
FIG. 2 is an isometric view of the first embodiment showing the underside of the invention.

FIG. 1 is a front elevation view of the first embodiment 1 of the present invention. FIG. 2 is an isometric view of the first embodiment 1 showing the underside of the first embodiment 1. As shown in FIGS. 1 and 2, the first embodiment 1 comprises a baseplate 2, a first smoke canister 3, a second smoke canister 4, an RF receiver circuit board 5, a coiled-wire RF receiver antenna 6, an auxiliary circuit board 7, a first battery 8, a second battery 9, a first wire pair 10 that is connected to a second wire pair 11 via a first electrical connector 12, a third wire pair 13 that is connected to a fourth wire pair 14 via a second electrical connector 15, a first threaded top 16, a second threaded top 17, a battery containment strap 18 and an optional laser pointer 19. The baseplate 2 is preferably manufactured from 1/16-inch to 1/8-inch thick aluminum sheet.

The first and second smoke canisters 3 and 4 are preferably commercially available products. In one example, the first and second smoke canisters 3 and 4 have a length of about 3.5 inches and a diameter of about 1.5 inch. The first and second smoke canisters 3 and 4 are preferably cylindrical in shape, positioned with their top surfaces in contact with the bottom surface of the baseplate 2, and oriented with their longitudinal axes perpendicular to the bottom surface of the baseplate 2. The RF receiver circuit board 5 is preferably a commercially available product having a separate output channel for each dispersant device and is attached to the bottom surface of the baseplate 2 by adhesive or screws, with the top surface of the RF circuit board 5 oriented perpendicularly to the bottom surface of the baseplate 2. RF receiver antenna 6 is preferably manufactured from coiled copper wire. The proximal end of the RF receiver antenna 6 is preferably soldered to the RF receiver circuit board 5, and its distal end is unattached. Although the invention is shown with two dispersant devices (the first smoke canister 3 and the second smoke canister 4), the invention may be manufactured with any number of dispersant devices, as described in reference to FIG. 15.

The auxiliary circuit board 7 (described in detail in reference to FIG. 11) is a custom-made device that supplies sufficient electrical current to activate an electric match, solenoid, or electric primer. The auxiliary circuit board 7 is preferably attached to the bottom surface of the baseplate 2 with adhesive or screws and is preferably oriented with its bottom surface parallel to the bottom surface of the baseplate 2. The first battery 8 is preferably a low-amperage, continuous output power source for the RF receiver circuit board 5 and the optional laser pointer 19. One example of a suitable battery 8 is the 6-volt A544 battery marketed by Energizer Holdings. The second battery 9 is preferably a high-amperage, intermittent-output power source for the electric match, solenoid, and electric primer. One example of a suitable battery 9 is the 3-volt CR2 battery marketed by Energizer Holdings Inc. of St. Louis, Mo. The first battery 8 and the second battery 9 are generally cylindrical in shape, attached to the bottom surface of the baseplate 2 with the battery containment strap 18, and oriented with their longitudinal axes parallel to the long axis of the baseplate 2. The battery containment strap 18 may be comprised of an elastic band, a VELCRO™ strip, adhesive tape, or other suitable type of containment strapping. The first wire pair 10 and the second wire pair 11 supply electrical ignition current from the auxiliary circuit board 7 to a first electric match (shown in FIG. 7) that is installed within the first smoke canister 3. The third wire pair 13 and the fourth wire pair 14 supply electrical ignition current from the auxiliary circuit board 7 to a second electric match that is installed within the second smoke canister 4. The first electrical connector 12 and the second electrical connector 15 are preferably quick connect/disconnect connectors that allow for rapid replacement of used canisters with fresh canisters. The first threaded top 16 (shown in detail in FIG. 7) and the second threaded top 17 are preferably machined or molded from metal or polymer and are used to secure the electric matches within the first smoke canister 3 and the second smoke canister 4, respectively, and also to removably attach the first smoke canister 3 and the second smoke canister 4 to the baseplate 2. The optional laser pointer 19 is preferably a commercially available device that is generally cylindrical in shape, attached to the baseplate 2 by adhesive or screws, and positioned so that laser light is emitted from the device in a generally downward direction parallel to the longitudinal axes of the first smoke canister 3 and the second smoke canister 4, so as to provide an illuminated spot at the location where the dispersant smoke will strike. The laser pointer 19 may be located at any position on the baseplate 2 that allows the emitted light from the laser pointer 19 to travel downward without striking any of the components of the present invention. The use of the laser pointer as an aiming device is described in reference to FIG. 14.

Figure 3:
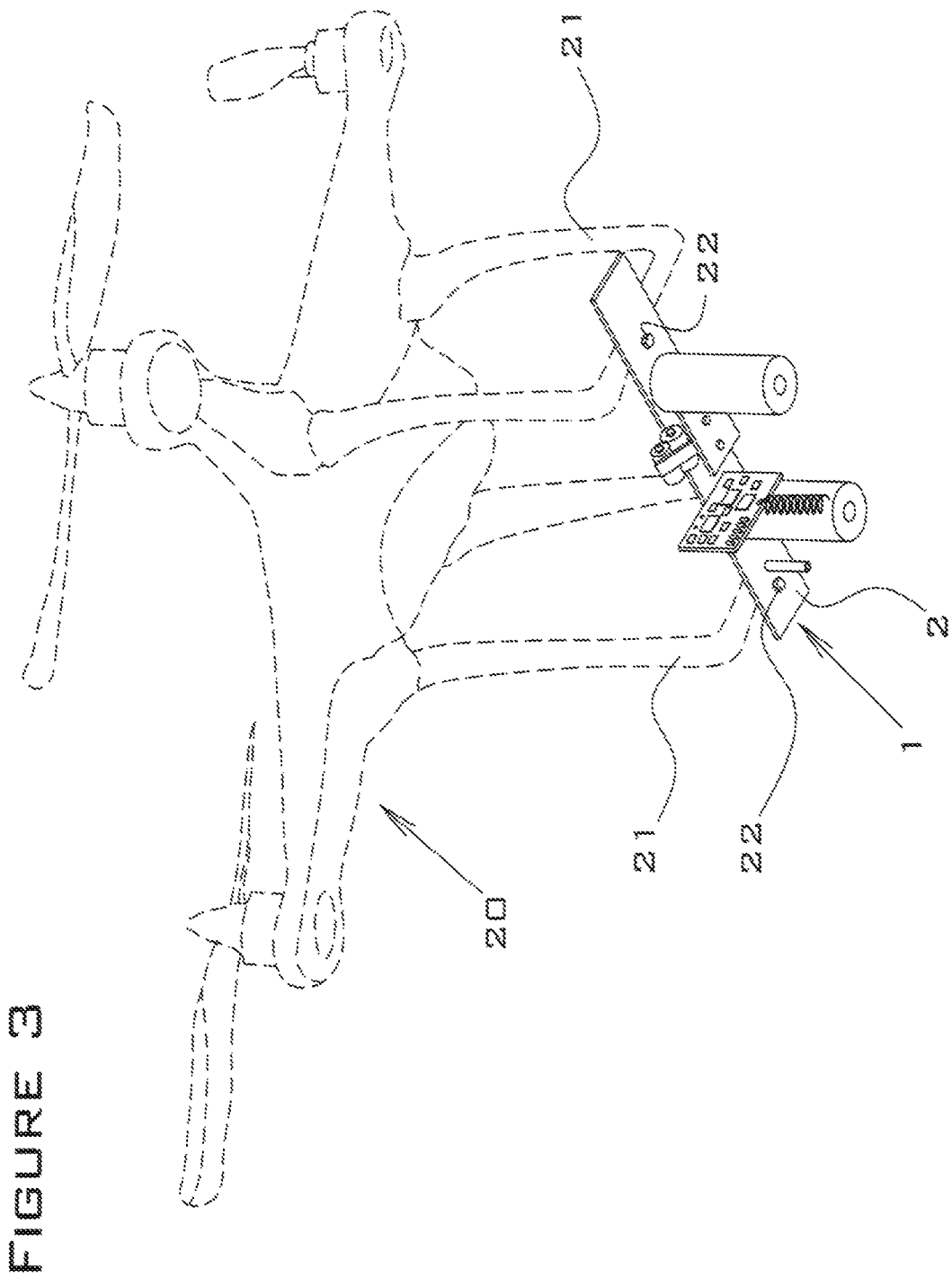
FIG. 3 is a perspective view of the first embodiment illustrating a method of mounting the first embodiment to a UAV.

FIG. 3 is a perspective view illustrating a method of mounting the first embodiment 1 to a UAV 20. In this example, the baseplate 2 of the first embodiment 1 is attached to the underside of the landing legs 21 of the UAV 20 by conventional bolts 22 that pass through the baseplate 2 and landing legs 21 and are secured with nuts (not shown). Alternately, other fasteners such as quick-release pins may be used to attach the baseplate 2 to the landing legs 21.

FIG. 4 is a perspective view of the first embodiment 1 of the present invention mounted to a UAV 20 that is similar to FIG. 3, except that a protective housing 23 is shown surrounding a portion of the first embodiment 1. As used herein, the term "housing" includes any container, encapsulation, covering, shroud, or any other structure or material that is configured to protect, enclose or surround an object, either wholly or partially. The protective housing encompasses the baseplate 2, the RF receiver circuit board 5, the RF receiver antenna 6, the auxiliary circuit board 7, the first battery 8, the second battery 9, the first through fourth wire pairs 10, 11, 13 and 14, the first and second electrical connectors 12 and 15, the first and second threaded tops 16 and 17, the battery containment strap 18, and the tops and sides of the first smoke canister 3, the second smoke canister 4, and the laser pointer 19 (shown in FIGS. 1 through 3); the bottom surfaces of the first smoke canister 3, the second smoke canister 4, and the laser pointer 19 protrude through openings in the bottom side of the protective housing 23, as shown in FIG. 4. The protective housing 23 may be manufactured from polymer, sheet metal, or other suitable materials that prevent water, grit, and other debris from contacting the other components of the first embodiment 1. Although the protective housing 23 is shown in FIG. 4 as being generally rectangular parallelepiped-shaped, it may be manufactured in any shape that provides weatherproofing to the first embodiment 1. The protective housing 23 may be employed with any of the embodiments described, and is omitted from all of the drawing except for FIG. 4 for the purpose of clarity.

FIG. 5 is a front elevation view of the second embodiment of the present invention. The second embodiment 24 is similar in configuration to the first embodiment 1 (shown in FIGS. 1 through 4), except that the electric match components of the first embodiment are replaced by solenoid-fired components in the second embodiment 24. As shown in FIG. 5, a first wire pair 10 and second wire pair 11 are connected via a first electrical connector 12 to a first linear solenoid 25, and a third wire pair 13 and a fourth wire pair 14 are connected via a second electrical connector 15 to a second linear solenoid 26. The first linear solenoid 25 is removably connected a first percussion-primed chemical dispersant canister 27 via a first solenoid connector 28 and the second linear solenoid 26 is removably connected to a second percussion-primed chemical dispersant canister 29 via a second solenoid connector 30. The first linear solenoid 25 is used to ignite the first percussion-primed chemical dispersant canister 27, and the second linear solenoid 26 is used to ignite the second percussion-primed chemical dispersant canister 29. The first and second percussion-primed chemical dispersant canisters 27 and 29 are preferably cylindrical in shape and are positioned with their top surfaces in contact with the bottom surface of the baseplate 2, with their longitudinal axes perpendicular to the bottom surface of the baseplate 2. The first linear solenoid 25 and the first solenoid connector 28 are positioned above the top surface of the baseplate 2, with their longitudinal axes aligned with the longitudinal axis of the first percussion-primed chemical dispersant canister 27. The second linear solenoid 26 and the second solenoid connector 30 are positioned above the top surface of the baseplate 2 so that their longitudinal axes are aligned with the longitudinal axis of the second percussion-primed chemical dispersant canister 29. Details of the ignition process of the second embodiment are shown reference to FIG. 8.

FIG. 6 is a front elevation view of the third embodiment of the present invention. The third embodiment 31 is similar to the second embodiment 24 (shown in FIG. 5) except that the linear solenoids and percussion-primed dispersant canisters of the second embodiment 24 are replaced by electrically primed chemical dispersant canisters. As shown in FIG. 6, a first wire pair 10 and a second wire pair 11 are connected via a first electrical connector 12 to a first electrically primed chemical dispersant canister 32, and a third wire pair 13 and a fourth wire pair 14 are connected via a second electrical connector 15 to a second electrically primed chemical dispersant canister 33. The first and second electrically primed chemical dispersant canisters 32 and 33 are preferably cylindrical in shape, and positioned with their top surfaces in contact with the bottom surface of the baseplate 2, with their longitudinal axes perpendicular to the bottom surface of the baseplate 2. The first electrically primed chemical dispersant canister 32 is removably attached to the baseplate 2 by a first threaded connector 16 whose male threaded portion extends through a first hole in the baseplate 2. The second electrically primed chemical dispersant canister 33 is removably attached to the baseplate 2 by a second threaded connector 17 whose male threaded portion extends through a second hole in the baseplate 2. Details of the ignition process and threaded connections of the third embodiment are shown in reference to FIGS. 9 and 10.

Figure 7:
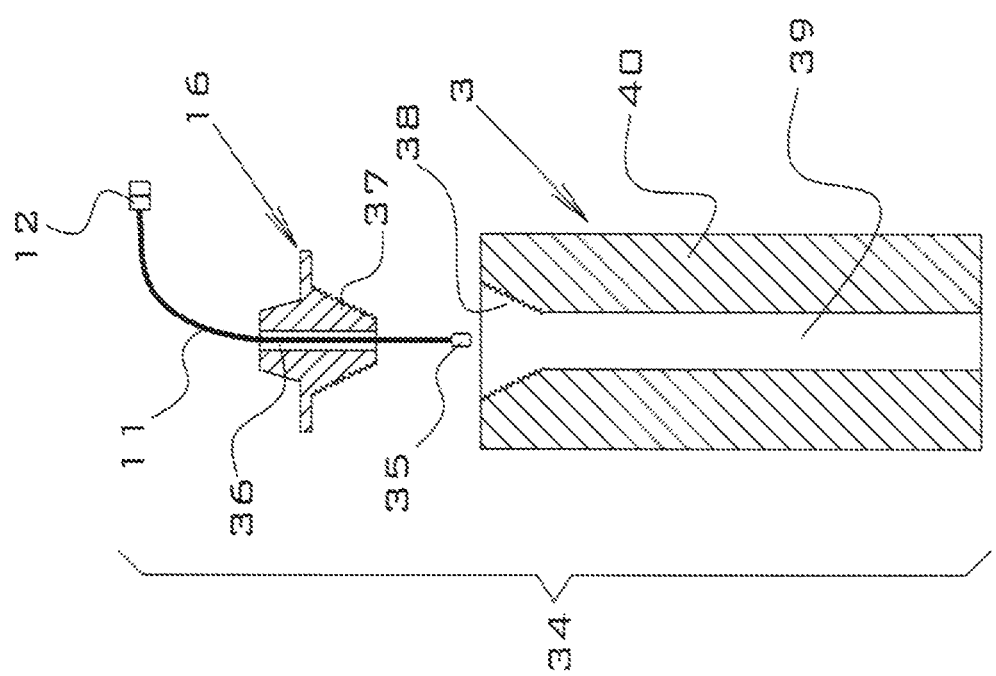
FIG. 7 is an exploded longitudinal cross-section view of the first smoke canister assembly of the first embodiment.

FIG. 7 is an exploded longitudinal cross-section view of the first smoke canister assembly 34 of the first embodiment, with the section line taken through the center of the first smoke canister 3. As shown, an electric match 35 is connected to the lower terminal end of the second wire pair 11. The second wire pair 11 passes through a central bore 36 of the first threaded top 16 and is connected at its upper terminal end to the first electrical connector 12. The male threaded portion 37 of the first threaded top 16 screws into the female threaded portion 38 of the first smoke canister 3. When the first smoke canister assembly 34 is assembled, the electric match 35 is positioned within the open central bore 39 of the first smoke canister 3. When the electric match 35 is ignited by passing an electric current through it, the flammable smoke-producing compound 40 within the first smoke canister 3 is ignited by flames produced by the burning electric match 35, and smoke is emitted downward through the bore 39 of the first smoke canister 3 as long as the smoke-producing compound 40 is burning. One suitable commercially available electric match component is the MJG FIREWIRE INITIATOR™ marketed by MJG Technologies of Blenhelm, N.J.

Figure 8:
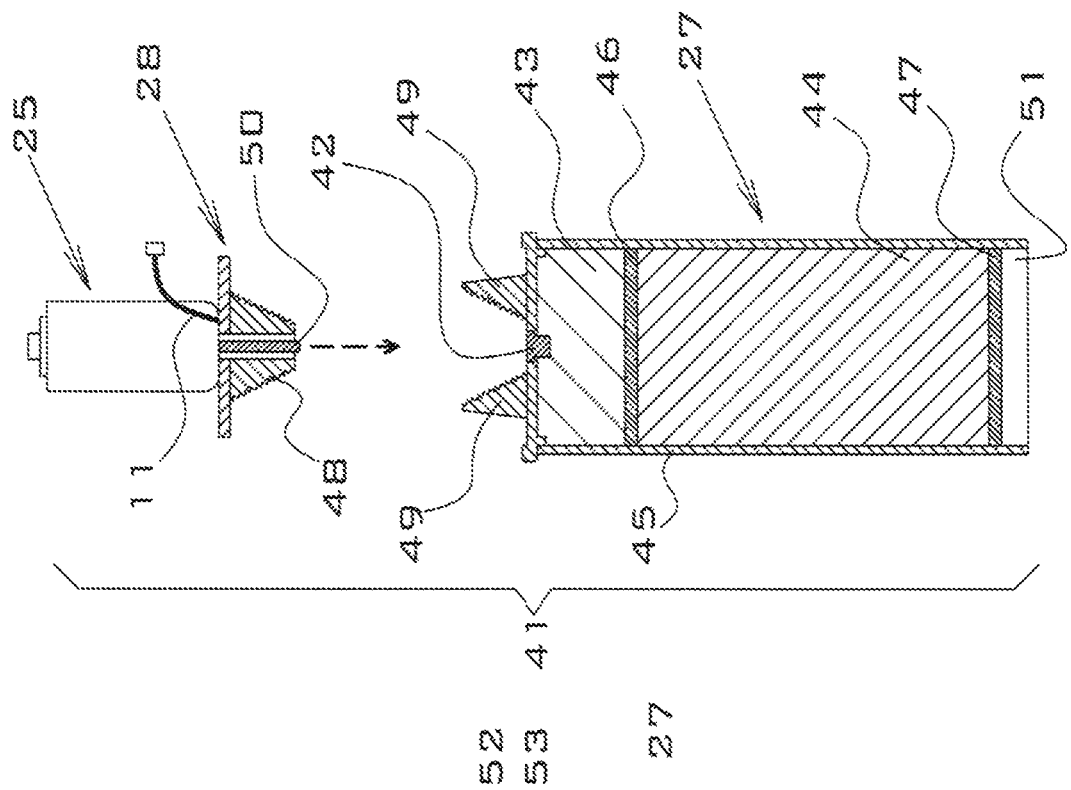
FIG. 8 is an exploded longitudinal cross-section view of the first percussion-primed chemical dispersant canister assembly of the second embodiment.

FIG. 8 is an exploded longitudinal cross-section view of the first percussion-primed chemical dispersant canister assembly 41 of the second embodiment, with the section line taken through the center of the first percussion-primed chemical dispersant canister 27. The first percussion-primed chemical dispersant canister 27 comprises a percussion primer 42 that is similar to the primers comprised in common firearm ammunition (such as the primers in 12-gauge shotshells), a propellant charge 43, a chemical dispersant agent 44, a casing 45, a first wad 46 that separates the propellant charge 43 from the chemical dispersant agent 44, and a second wad 47 that secures the chemical dispersant agent 44 within the casing 45. The first linear solenoid 25 is mounted to the first solenoid connector 28. The first solenoid connector 28 is removably attachable to the first percussion-primed chemical dispersant canister 27 by screwing the male threaded portion 48 of the first solenoid connector 28 into the female threaded portion 49 of the first percussion-primed chemical dispersant canister 27. The longitudinal axis of the linear solenoid 25 is aligned with the longitudinal axis of the first percussion-primed chemical dispersant canister 27 so that the actuator rod 50 of the linear solenoid 25 is positioned directly above the percussion primer 42 of the first percussion-primed chemical dispersant canister 27.

When the first chemical dispersant canister assembly 41 of the second embodiment is assembled and electrical current passes through the first linear solenoid 25, the actuator rod 50 of the first linear solenoid 25 is forced downward (as shown by the dashed arrow), forcibly striking the top surface of the percussion primer 42. When the percussion primer 42 is forcibly struck, it detonates and sends a burst of flame into the propellant charge 43, which ignites and produces expanding gasses that rapidly force the chemical dispersant agent 44 out of the open bottom 51 of the casing 45. One suitable commercially available solenoid component is part number DSMS-0730-12 marketed by Delta Electronics, Inc. of Taipei, Taiwan (www.deltaww.com). The percussion-primed chemical dispersant canisters of the second embodiment are preferably commercially available devices. In one example, the canisters have a diameter of approximately 1.5 inch and a length of 4.5 inches.

FIG. 9 is an exploded longitudinal cross-section view of the first electrically primed chemical dispersant canister assembly 52 of the third embodiment. In the third embodiment, the first threaded top 16 is identical to the first threaded top 16 of the first embodiment shown in FIG. 7, and the first electrically primed chemical dispersant canister 32 is similar to the first percussion-primed chemical dispersant canister 27 of the second embodiment shown in FIG. 8, except that the electric primer 53 (which his ignited when electricity flows through it) of the third embodiment is different than the percussion primer 42 (which his ignited when struck with a blow) of the second embodiment. As shown, the male threaded portion 37 of the first threaded top 16 is removably attachable to the female threaded portion 49 of the first electrically primed chemical dispersant canister 32. FIG. 10 is a magnified view of the electric primer 53 shown in FIG. 9.

Referring to FIG. 10, the electric primer 53 comprises an inner electrode 54, a powder charge 55, and an outer electrode 56. One of the two wires of the second wire pair 11 is connected to the center electrode 54, and the other wire of the second wire pair 11 is connected to the outer electrode of the 56. When an electric current travels through the wire pair 11 (as shown by the dashed arrows), the current flows into the inner electrode 54, through the powder charge 55, and out of the outer electrode 56. The current produces an electric arc through the powder charge 55 that causes it to ignite, thereby igniting the propellant charge 43 and expelling the chemical dispersant agent 44 (shown in FIG. 9) as described previously in reference to FIG. 8.

FIG. 11 is a simplified electrical schematic that is applicable to all of the three preferred embodiments of the present invention. This schematic shows a design with two firing circuits, although, as described previously, any of the embodiments can be manufactured with any number of dispersant canisters, with one firing circuit being required for each dispersant canister. As shown in FIG. 11, the major electrical components comprising the firing system include a two-channel RF transmitter 57, a two-channel RF receiver 58 that is powered by a first battery 8 and that comprises an RF circuit board 5 and an antenna 6, an auxiliary circuit board 7 that is powered by a second battery 9 and comprises a first transistor 59 and a second transistor 60, a first ignition device 61 and a second ignition device 62. (Note that two batteries are not necessary; the system may be run on the same single battery.) The RF transmitter 57 comprises a first firing button 63 (labeled A) and a second firing button 64 (labeled B).

When a human operator pushes the "A" firing button, an electromagnetic signal is wirelessly transmitted to the RF receiver 58. This signal causes the wireless receiver 58 to produce an output voltage that switches on the first transistor 59 of the auxiliary circuit board 7, thereby sending an electric current through the first ignition device 61, which activates the first ignition device 61. Similarly, when a human operator pushes the "B" firing button of the RF transmitter 57, the second transistor 60 is switched on, and the second ignition device 62 is subsequently activated. The first and second ignition devices 61 and 62 may be either the electric match of the first embodiment, the linear solenoid of the second embodiment, or the electric primer of the third embodiment.

The auxiliary circuit board 7 is preferably designed so that the electric match of the first embodiment, the linear solenoid of the second embodiment, or the electric primer of the third embodiment may be reliably fired or actuated without modifying the circuitry of the auxiliary circuit board 7. One suitable commercially available transistor component for use as the first and second transistors 59 and 60 is part number KEC1003 manufactured by KEC Corporation of Seoul, Korea (http://www.kec.co.kr/). The RF transmitter and receiver are preferably commercially available products. In one example, the RF transmission occurs on a frequency of 315 megahertz (MHz).

Figure 13:
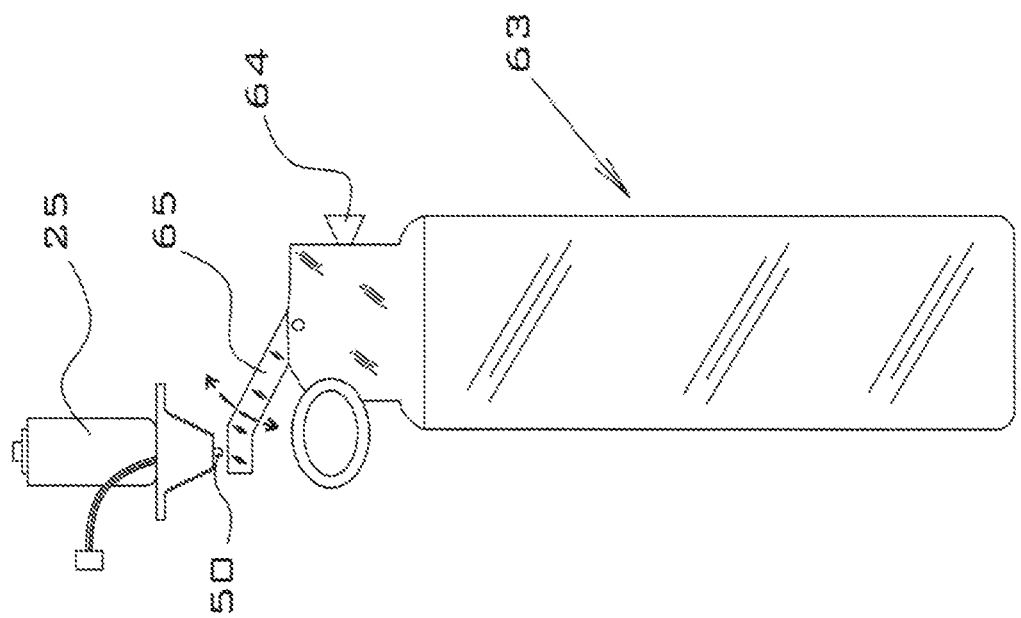
FIG. 13 is a side elevation view of a pepper spray canister that is mounted in proximity to a first linear solenoid.
Figure 12:
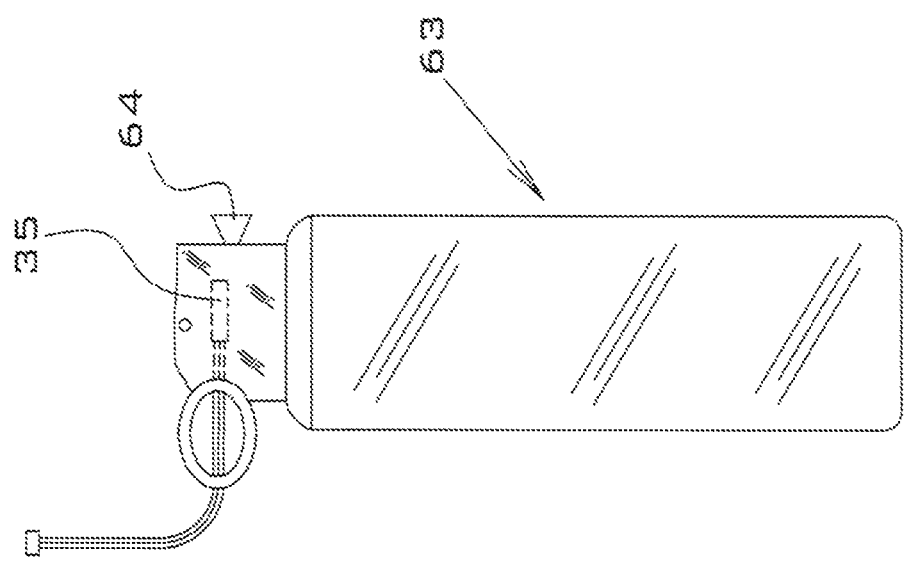
FIG. 12 is a side elevation view of a pepper spray canister that has been modified to accept an electric match.

The present invention may also be used in conjunction with compressed-gas (pressurized) canisters such as pepper spray and fire extinguishers, as illustrated in FIGS. 12 and 13. FIG. 12 is a side elevation view of a pepper spray canister 63 that has been modified to accept an electric match 35 that is positioned in proximity to the internal shut-off valve (not shown) of the pepper spray canister 63. (For clarity, the mounting components of the canister and electric match have been omitted.) When the electric match 35 is ignited (as described previously in reference to the descriptions of the first embodiment), the flame produced by the electric match 35 melts or burns away the shut off valve of the pepper spray canister 63, thereby causing the entire contents of the pepper spray canister 63 to be released via the outlet nozzle 64.

FIG. 13 is a side elevation view of a pepper spray canister 63 that is mounted in proximity to a first linear solenoid 25 so that the actuator rod 50 of the linear solenoid 25 is positioned just above the release valve lever 65 of the pepper spray canister 63. (For clarity, the mounting components for the canister and linear solenoid have been omitted.) When the first linear solenoid 25 is actuated (as described previously in reference to descriptions of the second embodiment), the actuator rod 50 is forced downward, thereby depressing the release valve lever 65 of the pepper spray canister 63 (as shown by the dashed arrow), which causes the contents of the pepper spray canister 63 to be released via the outlet nozzle 64. In this configuration, pepper spray is released only during time periods when the linear solenoid 25 is actuated; therefore, partial contents of the pepper spray canister 63 may be released at different times and in different locations by intermittently activating the linear solenoid 25. Although the example provided above involves the actuator rod pushing downward on a release lever, the actuator rod may also the pull the release lever (or actuator). In addition, the release mechanism may not necessarily be a lever but some other form of mechanical actuator.

Figure 14:
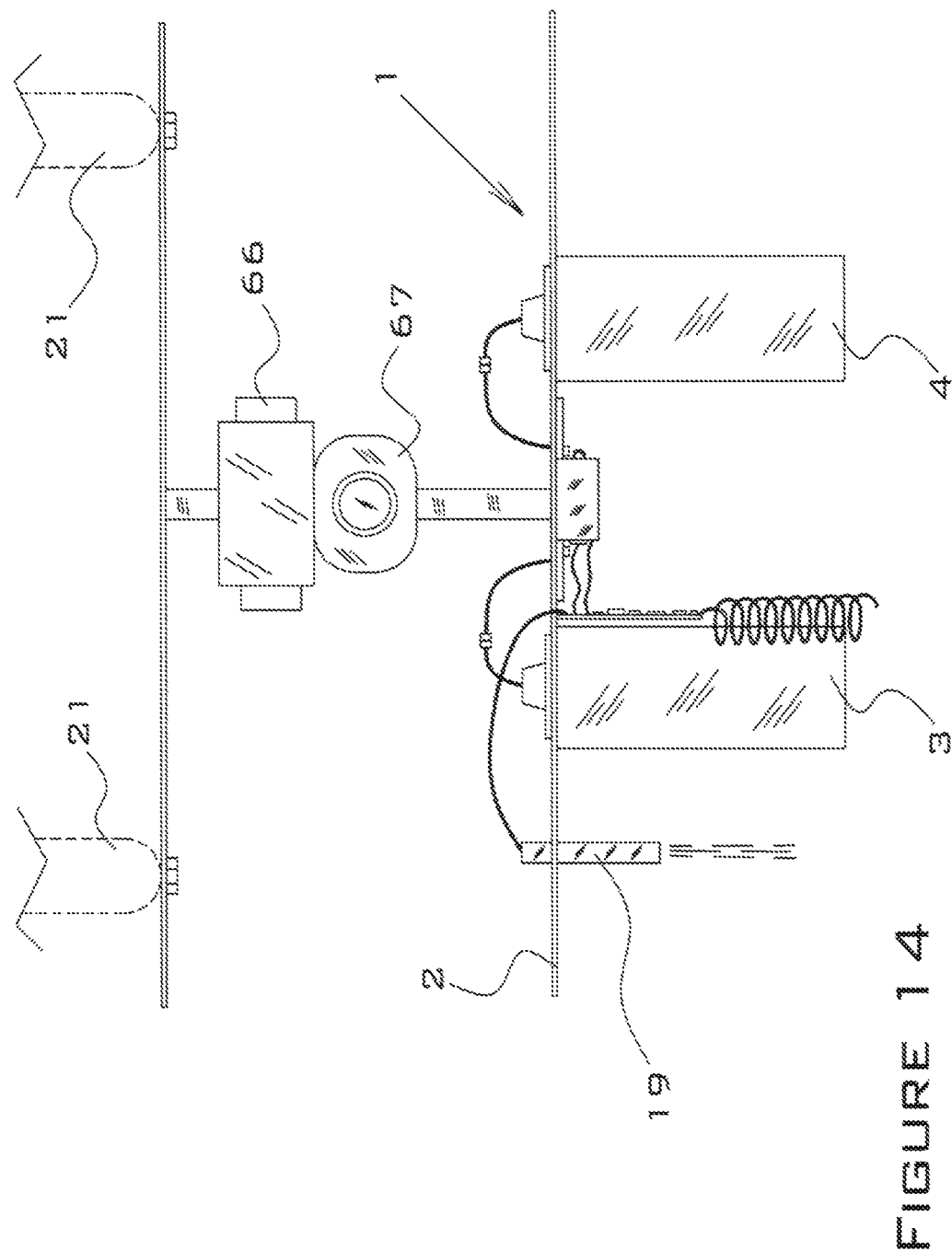
FIG. 14 is a front elevation view of the first embodiment of the present invention in which a gimbal and a video camera are mounted between the baseplate of the first embodiment and the landing legs of a UAV.

Any of the three preferred embodiments of the present invention may optionally comprise a gimbal, a camera, or both a gimbal and a camera. FIG. 14 is a front elevation view of the first embodiment 1 of the present invention in which a gimbal 66 and a video camera 67 are mounted between the baseplate 2 of the first embodiment and the landing legs 21 of a UAV. In this configuration, the orientations of the first smoke canister 3 and the second smoke canister 4 may be adjusted from side to side and from front to rear, independently of the orientation of the landing legs 21, by remotely adjusting the gimbal 66. In FIG. 14, the video camera 67 is shown as pointing in a generally forward direction. Alternately, the directions of the video camera 67, the smoke canister discharges, and the laser pointer 19 may be aligned so that the light emitted from the laser pointer 19 indicates the point at which the smoke will strike and the camera shows the position of the laser light as it reflects from a potential target. This arrangement is useful for allowing precision aiming of the smoke dispersal by a remote operator who is equipped with a video view of the camera image and remote controls for the gimbal.

The present invention is capable of being mounted on a variety of commercially available UAVs. The quantity and sizes of dispersant devices that may be included on a particular configuration of the present invention are limited by the total weight of the present invention and the carrying capacity of the UAV that is employed. In one example, A UAV having a weight of 2.56 pounds was capable of carrying a unit of the first embodiment of the present invention that comprised two smoke canisters and had a total weight of 0.56 pounds.

FIG. 15 is a perspective view of the underside of a baseplate 2 that is fitted with eight canisters 68, which may consist of any of the types of smoke or chemical dispersant canisters described previously for the three embodiments. This baseplate configuration is compatible with any of the three embodiments of the present invention. Note that each of the eight canisters 68 must be ignited with its own individual ignition device (either electric match, linear solenoid, or electric primer), not shown.

In an alternate embodiment, a commercially available universal rail mount system, such as, but not limited to, the PICATINNY ADAPTER™ sold by Spartan Precision Equipment Ltd. of Offham, Lewes, United Kingdom, is attached to the baseplate. Such a system could be used to mount a speaker, flashlight, or any other device to the baseplate.

Each of the three embodiments has certain advantages and disadvantages compared to the other embodiments, which may make a particular embodiment preferable for a particular application. For example, the electric matches of the first embodiment are readily available, lightweight, and efficient for igniting flammable compounds such as smoke-producing agents but are not suitable for igniting percussion primers. The solenoids of the second embodiment are preferred for igniting commercially available dispersant devices that incorporate percussion primers but are relatively heavy. The electric primers of the third embodiment are less expensive than electric matches but require a higher ignition voltage and are not as readily available as percussion primers.

Although the preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An accessory for an unmanned aerial vehicle, the accessory comprising:
    (a) a baseplate that is configured to be attached to the unmanned aerial vehicle, the unmanned aerial vehicle having landing legs, the baseplate being attached to the landing legs of the unmanned aerial vehicle;
    (b) at least one smoke canister that is removably attached to the baseplate;
    (c) a radio frequency receiver comprising:
        (i) a radio frequency circuit board that is attached to the baseplate; and
        (ii) a radio frequency receiver antenna with a proximal end that is mounted to the radio frequency receiver circuit board and a distal end that is unattached;
    (d) an electric match that is installed within the smoke canister, the smoke canister comprising a threaded top that is configured to secure the electric match within the smoke canister and to removably attach the smoke canister to the baseplate;
    (e) an auxiliary circuit board that is attached to the baseplate and configured to supply electrical current sufficient to activate the electric match;
    (f) at least one battery that is attached to the baseplate and configured to provide an output power source for the radio frequency receiver circuit board and the electric match;
    (g) a first wire pair that is connected to a second wire pair via an electrical connector, wherein the first and second wire pairs supply electrical ignition current from the auxiliary circuit board to the electric match, wherein the second wire pair has an upper terminal end, wherein the second wire pair passes through a central bore of the threaded top of the smoke canister and is connected at the upper terminal end of the second wire pair to the electrical connector, wherein the threaded top of the smoke canister comprises a male threaded portion and a female threaded portion, wherein the male threaded portion of the threaded top of the smoke canister screws into the female threaded portion of the smoke canister, wherein the smoke canister comprises an open central bore, wherein the electric match is positioned within the open central bore of the smoke canister, wherein the smoke canister contains a flammable smoke-producing compound, wherein when the electric match is ignited bypassing an electric current through it, the flammable smoke-producing compound within the smoke canister is ignited by flames produced by the burning electric match, and smoke is emitted downward through the open central bore of the smoke canister, and wherein the electrical connector is situated between the threaded top of the smoke canister and the auxiliary circuit board;

(h) a protective housing that surrounds the radio frequency receiver circuit board and the battery; and (i) a radio frequency transmitter that is in communication with the radio frequency receiver, the radio frequency transmitter comprising a radio frequency transmitter circuit board and at least one switch, wherein the auxiliary circuit board comprises a transistor, and wherein the transistor is configured to send an electric current through the electric match.

2. The accessory of claim 1, further comprising a gimbal that is mounted to an underside of the unmanned aerial vehicle, wherein the baseplate is mounted to an underside of the gimbal.

3. The accessory of claim 2, further comprising a camera that is mounted to the gimbal.

4. The accessory of claim 1, further comprising a camera that is mounted to the baseplate.

5. The accessory of claim 1, further comprising a laser pointer that is attached to the baseplate and configured to emit laser light in a generally downward direction parallel to the longitudinal axis of the smoke canister.

6. The accessory of claim 1, wherein the baseplate further comprises a universal rail mount system for attachment of additional accessories.

7. The accessory of claim 1, wherein the baseplate is attached to the landing legs of the unmanned aerial vehicle with quick-release pins.

8. The accessory of claim 1, wherein the baseplate is attached to the landing legs of the unmanned aerial vehicle with bolts.

9. The accessory of claim 1, wherein the radio frequency circuit board has a top surface, and the top surface of the radio frequency circuit board is oriented perpendicularly to a bottom surface of the baseplate.

10. The accessory of claim 1, wherein the auxiliary circuit board has a bottom surface, and the bottom surface of the auxiliary circuit board is parallel to a bottom surface of the baseplate.

11. The accessory of claim 1, wherein the smoke canister is cylindrical in shape.

12. The accessory of claim 11, wherein the smoke canister has a longitudinal axis, and wherein the longitudinal axis of the smoke canister is perpendicular to a bottom surface of the baseplate.

13. The accessory of claim 1, wherein the radio frequency receiver antenna has the proximal end and the distal end, wherein the proximal end of the radio frequency receiver antenna is soldered to the radio frequency circuit board, and wherein the distal end of the radio frequency receiver antenna is unattached.

* * * * *